US012580236B2

(12) United States Patent
Mizoguchi et al.

(10) Patent No.: US 12,580,236 B2
(45) Date of Patent: Mar. 17, 2026

(54) BATTERY PACK, CHARGING SYSTEM, AND METHOD FOR CHARGING BATTERY PACK

(71) Applicant: FDK CORPORATION, Tokyo (JP)

(72) Inventors: Yasunari Mizoguchi, Tokyo (JP); Yusuke Kusagaya, Tokyo (JP)

(73) Assignee: FDK CORPORATION, Tokyo (JP)

( * ) Notice: Subject to any disclaimer, the term of this patent is extended or adjusted under 35 U.S.C. 154(b) by 713 days.

(21) Appl. No.: 17/906,066

(22) PCT Filed: Feb. 4, 2021

(86) PCT No.: PCT/JP2021/004107
§ 371 (c)(1),
(2) Date: Sep. 9, 2022

(87) PCT Pub. No.: WO2021/186937
PCT Pub. Date: Sep. 23, 2021

(65) Prior Publication Data
US 2023/0118126 A1 Apr. 20, 2023

(30) Foreign Application Priority Data

Mar. 17, 2020 (JP) ................................. 2020-046724

(51) Int. Cl.
*H01M 10/42* (2006.01)
*H01M 10/44* (2006.01)
(Continued)

(52) U.S. Cl.
CPC ....... *H01M 10/4257* (2013.01); *H01M 10/44* (2013.01); *H01M 10/46* (2013.01);
(Continued)

(58) Field of Classification Search
CPC .. H01M 10/4257; H01M 10/44; H01M 10/46; H01M 10/48; H01M 2010/4271; H02J 7/0047; H02J 7/0049; H02J 7/00711; H02J 7/00714; H02J 7/00716; H02J 7/00718; Y02E 60/10
See application file for complete search history.

(56) References Cited

FOREIGN PATENT DOCUMENTS

JP H06196206 A 7/1994
JP H089565 A 1/1996
(Continued)

OTHER PUBLICATIONS

Machine translation JP2009112115A (Year: 2009).*
(Continued)

*Primary Examiner* — Victoria H Lynch
(74) *Attorney, Agent, or Firm* — Kinney & Lange, P.A.

(57) ABSTRACT

A battery pack is provided in which the battery pack itself can recognize a determination of a full charge, which is made by a charger, without using a communication line. A battery pack is provided with a secondary battery, current measurement means for measuring a charging current for charging the secondary battery, and a control circuit which receives an output signal from the current measurement means. The control circuit determines that the secondary battery is fully charged when a reduction rate of the charging current in a unit time exceeds a predetermined value.

8 Claims, 4 Drawing Sheets

(51) Int. Cl.
    *H01M 10/46*     (2006.01)
    *H01M 10/48*     (2006.01)
    *H02J 7/00*     (2006.01)

(52) U.S. Cl.
    CPC ......... *H01M 10/48* (2013.01); *H02J 7/00711*
        (2020.01); *H02J 7/00716* (2020.01); *H01M*
                            *2010/4271* (2013.01)

(56) References Cited

FOREIGN PATENT DOCUMENTS

| | | |
|---|---|---|
| JP | H08306397 A | 11/1996 |
| JP | 2004184135 A | 7/2004 |
| JP | 2009112115 A | 5/2009 |
| JP | 2016518649 A | 6/2016 |

OTHER PUBLICATIONS

Machine translation JPH06196206A (Year: 1994).*
Machine translation JPH08306397A (Year: 1996).*
Machine translation JPH089565A (Year: 1996).*
International Search Report and Written Opinion dated Apr. 13, 2021, for corresponding PCT Application No. PCT/JP2021/004107.
Extended European Search Report for EP Application No. 21770635. 7, dated Apr. 15, 2024, 8 pages.

\* cited by examiner

FIG. 4

BATTERY PACK, CHARGING SYSTEM, AND METHOD FOR CHARGING BATTERY PACK

CROSS-REFERENCE TO RELATED APPLICATION(S)

This application is the national phase of PCT Application No. PCT/JP2021/004107 filed on Feb. 4, 2021, which claims priority to Japanese Application No. 2020-0046724 filed on Mar. 17, 2020, the contents of which are incorporated herein by reference in their entirety.

BACKGROUND

Technical Field

The present disclosure relates to a battery pack including a secondary battery and a method for charging the battery pack.

Background Art

Conventionally, a charger has been developed and sold as a dedicated set with a battery pack. Therefore, information of the charger can be easily provided to the battery pack by providing communication means between the charger and the battery pack.

In recent years, general-purpose chargers that can charge a plurality of types of battery packs have come into existence. Such a charger measures the battery voltage and the battery temperature of the battery pack on the side of the charger so as to control the charging of the battery pack. When the general-purpose charger is used to charge the battery pack, the battery capacity is determined on the side of the battery pack if the battery capacity can be indicated on the side of the battery pack. Therefore, when the charger charges the battery pack, it is necessary to match the capacity indication on the side of the battery pack with the capacity indication of the charger. Since the charger normally indicates either one of the two: "charging" and "charge complete", it is necessary for the battery pack to match the indication thereof with the indication of the charge complete of the charger. Therefore, the battery pack is provided with a communication line that can communicate with a control unit of the charger separately from a battery charging line, grasps the charge complete on the side of the charger, and matches the indication of "charge complete" thereof with that of the charger.

PRIOR ART DOCUMENT

Patent Document

Patent Document 1: Japanese Patent Laid-Open No. 2004-184135

SUMMARY

However, providing the communication line between the charger and the battery pack separately from the charging line results in an increase in the number of terminals on the surfaces of the cases of both the charger and the battery pack, thereby complicating wiring of signal lines extending from the respective control circuits of the charger and the battery pack.

In view of the above problems, an object of the present disclosure is to provide a battery pack capable of determining charge complete consistent with that of a charger without providing a communication line between the charger and the battery pack.

According to a first aspect of the present disclosure, there is provided a battery pack including a secondary battery, current measurement means for measuring a charging current for charging the secondary battery, and a control circuit which receives an output signal from the current measurement means, in which the control circuit determines that the secondary battery is fully charged when a reduction rate of the charging current in a unit time exceeds a predetermined value.

With the configuration described above, since the current measurement means measures the charging current for charging the secondary battery, the control circuit determines that the secondary battery is fully charged when the reduction rate of the charging current in the unit time exceeds the predetermined value on the basis of the measured value. In this manner, the battery pack can determine a full charge of the battery pack itself from the reduction rate of the charging current per unit time without receiving a signal from the charger that charges the battery pack to notify that the battery pack is fully charged.

According to a second aspect of the present disclosure, in the first aspect, the charging current includes a rapid charging current for increasing a battery capacity of the secondary battery and a supplementary charging current for maintaining a full charge of the secondary battery, and the reduction rate of the charging current in the unit time corresponds to a change rate of the charging current when the charging current is switched from the rapid charging current to the supplementary charging current.

The rapid charging current includes a large amount of current for increasing the battery capacity of the secondary battery, and the supplementary charging current includes a considerably small amount of current for maintaining the full charge of the secondary battery, as compared with the amount of the rapid charging current. Therefore, when the charging current is switched from the rapid charging current to the supplementary charging current, the control circuit can determine that the secondary battery is fully charged.

According to a third aspect of the present disclosure, in the second aspect, the rapid charging current is composed of a pulse current having a first duty ratio, the supplementary charging current is composed of a pulse current having a second duty ratio shorter than the first duty ratio, and the control circuit determines that the battery pack is fully charged when a duty ratio of the charging current is switched from the first duty ratio to the second duty ratio.

The pulse current of the rapid charging current has a larger duty ratio so as to increase the battery capacity of the secondary battery, and the pulse current of the supplementary charging current has a smaller duty ratio because the supplementary charging current suffices to maintain the full charge of the secondary battery. Therefore, when the charging current is a pulse current and the duty ratio becomes smaller, the control circuit can determine that the secondary battery is fully charged.

According to a fourth aspect of the present disclosure, in any one of the first to third aspects, indication means for indicating a charge state of the secondary battery is further provided, and the control circuit causes the indication means to indicate a full charge state of the secondary battery when the control circuit determines that the secondary battery is fully charged.

According to a fifth aspect of the present disclosure, there is provided a charging system, which includes a charger, and a battery pack charged by the charger, the battery pack being provided with a secondary battery, current measurement means for measuring a charging current for charging the secondary battery, and a control circuit which receives an output signal of the current measurement means. The charger selectively supplies a rapid charging current and a supplementary charging current to the battery pack. The rapid charging current is for increasing the battery capacity of the battery pack and the supplementary charging current is for maintaining a full charge of the battery pack. The control circuit in the battery pack determines that the secondary battery is fully charged when the charging current is switched from the rapid charging current to the supplementary charging current.

With the configuration described above, since the current measurement means measures the charging current in the battery pack, the control circuit can determine that the secondary battery is fully charged when a reduction rate of the charging current in a unit time exceeds a predetermined value on the basis of the output signal of the current measurement means without receiving a notification from the charger that the battery pack is fully charged. Therefore, the charger can obviate the need for a communication line that notifies the battery pack that the battery pack is fully charged. As a result, the charger can be easily configured, thereby making it possible to reduce the total number of components.

According to a sixth aspect of the present disclosure, there is provided a method for charging a battery pack provided with a secondary battery, current measurement means for measuring a charging current for charging the secondary battery, and a control circuit which receives an output signal of the current measurement means. The control circuit determines that the secondary battery is fully charged when a reduction rate of the charging current in a unit time exceeds a predetermined value.

According to the above, since the current measurement means measures the charging current for charging the secondary battery, the control circuit determines that the secondary battery is fully charged when the reduction rate of the charging current in the unit time exceeds the predetermined value on the basis of the measured value. Therefore, the battery pack can determine the full charge of the battery pack itself without receiving a signal from the charger, the signal indicating that the battery pack itself is fully charged.

According to a seventh aspect of the present disclosure, in the sixth aspect, the battery pack is further provided with indication means for indicating a charge state of the secondary battery, and the control circuit causes the indication means to indicate a full charge state of the secondary battery when the control circuit determines that the secondary battery is fully charged.

According to the present disclosure, the control circuit in the battery pack can determine that the battery pack is in a full charge state.

BRIEF DESCRIPTION OF THE DRAWINGS

FIG. 4 shows a time chart of a charging voltage and a charging current of the battery pack according to another embodiment.

DETAILED DESCRIPTION

An embodiment of the present disclosure will be described with reference to the drawings.

Figure 1:
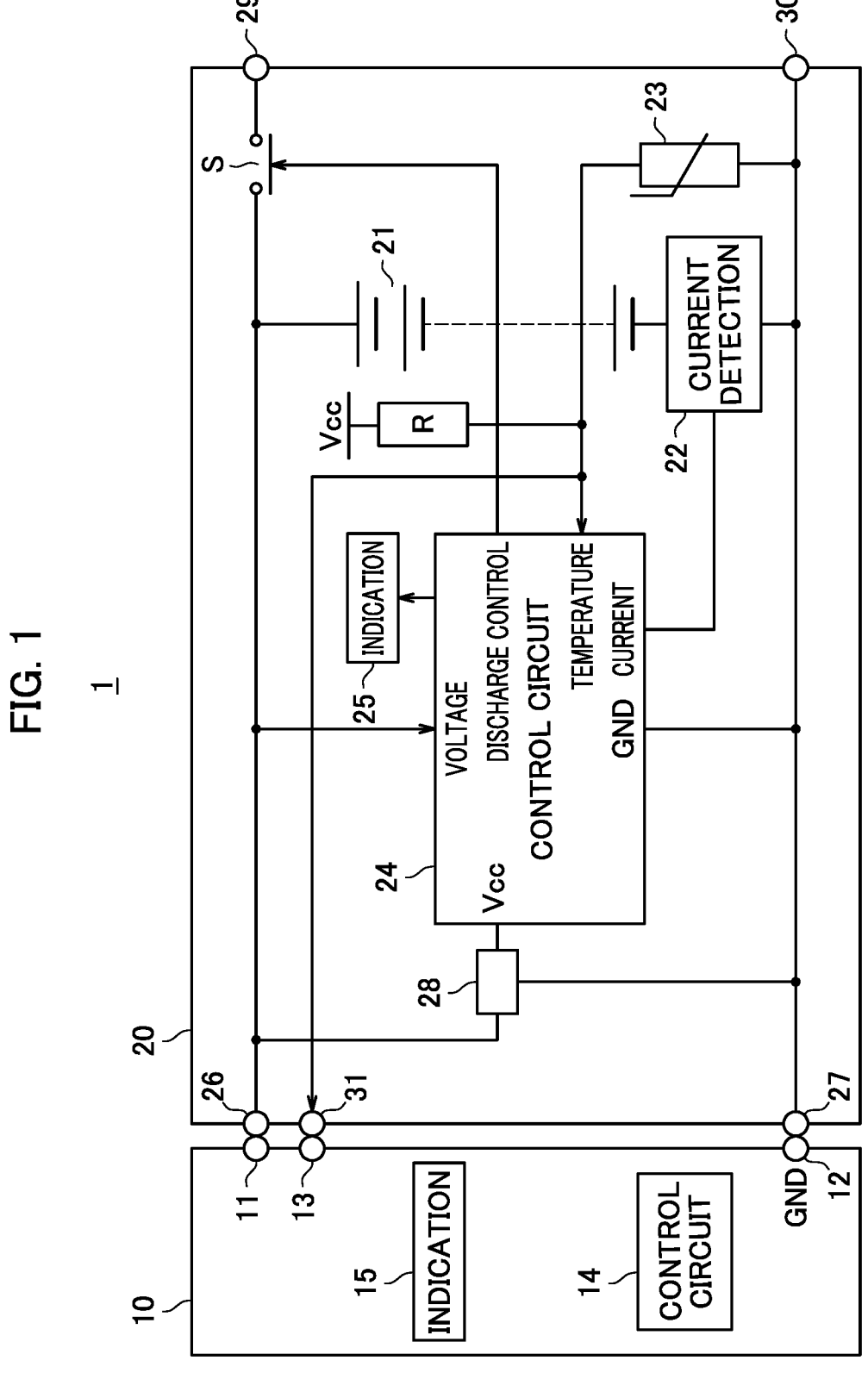
FIG. 1 shows a circuit diagram of a charger according to an embodiment.

FIG. 1 shows a charging system 1 including a charger 10 and a battery pack 20 to be charged by the charger 10.

The charger 10 is a general-purpose type for trickle charging that does not limit the battery pack 20 to be charged, and can perform a rapid charging for increasing a battery capacity of the battery pack 20 and a supplementary charging for maintaining a full charge state of the battery pack 20. The charger 10 includes a positive electrode terminal 11 on a higher potential line that flows a charging current, and a negative electrode terminal 12 on a lower potential line. The charger 10 includes a battery temperature detection terminal 13 to receive a battery temperature signal of the connected battery pack 20. The charger 10 includes a control circuit 14 that controls charging of the battery pack 20, an indication unit 15 that indicates a charge state of the battery pack 20, and a voltage detection unit (not shown) that detects a battery voltage of the battery pack 20.

The control circuit 14 detects whether the battery pack 20 is connected, determines the type of the connected battery pack 20, and flows the charging current suitable for the battery pack 20. During charging of the battery pack 20, the control circuit 14 detects the battery voltage and a battery current, and adjusts a charging voltage and the charging current on the basis of the detected battery voltage and battery temperature so as to control the charging of the battery pack 20. More specifically, the control circuit 14 switches the rapid charging and the supplementary charging according to the battery voltage of the battery pack 20. Therefore, the charger 10 flows a rapid charging current to the battery pack 20 during the rapid charging, and flows a supplementary charging current to the battery pack 20 during the supplementary charging. It should be noted that in the present embodiment, the charging voltage is a different potential between the positive electrode terminal 11 and the negative electrode terminal 12 of the charger 10, and is equal to the battery voltage across the battery pack 20.

The indication unit 15 is composed of an LED, and is turned on to indicate that the battery pack is "charged" when the rapid charging for increasing the battery capacity of the battery pack 20 is performed, and is turned off to indicate "charge complete" when the rapid charging is completed.

The battery pack 20 has a secondary battery 21, a current detection unit 22 that detects the battery current flowing through the secondary battery 21, a thermistor 23 that detects the battery temperature, a control circuit 24 that controls charging and discharging of the secondary battery 21, and an indication unit 25 that indicates the charging and discharging of the battery pack 20. The battery pack 20 supplies an electric power having a rated voltage of V0 during the discharging.

The secondary battery 21 includes a plurality of secondary battery cells such as nickel hydrogen cells which are connected in series. The positive electrode of the secondary battery 21 is connected to a charging positive electrode terminal 26, and the negative electrode thereof is connected to a charging negative electrode terminal 27. Further, the positive electrode of the secondary battery 21 is connected to a discharging positive electrode terminal 29 via a switch S, and the negative electrode thereof is connected to a discharging negative electrode terminal 30. A load device to which electric power is supplied by the battery pack 20 is connected between the discharging positive electrode terminal 29 and the discharging negative electrode terminal 30. The secondary battery 21 is an example of a secondary battery.

The current detection unit 22 is composed of a resistor, and is connected between the negative electrode of the secondary battery 21 and the charging negative electrode terminal 27. The current detection unit 22 is an example of current measurement means. The thermistor 23 detects a temperature of the secondary battery 21, and sends the output signal thereof to the control circuit 24 and also to the charger 10 through a battery temperature terminal 31.

The control circuit 24 is composed of a microcomputer, and electric power is supplied through a power supply IC 28 connected between the charging positive electrode terminal 26 and the charging negative electrode terminal 27. The control circuit 24 detects the battery voltage, and receives the battery temperature signal from the thermistor 23 and the battery current signal from the current detection unit 22, respectively. The control circuit 24 determines the charge state of the secondary battery 21 on the basis of the battery voltage and the battery current. In addition, when the load device is connected between the discharging positive electrode terminal 29 and the discharging negative electrode terminal 30, the control circuit 24 turns on the switch S to supply electric power to the load device.

The indication unit 25 is composed of five LEDs, and is connected to the control circuit 24 so as to indicate the charge state of the secondary battery 21 on the basis of a signal from the control circuit 24. The indication unit 25 turns on a red LED to indicate that the battery pack is "charged" when the rapid charging for increasing the battery capacity of the battery pack 20 is performed by the charger 10. After the rapid charging is completed, the indication is changed to "charge complete" and the indication unit 25 turns on one of the LEDs of other colors according to the actual battery capacity of the secondary battery 21.

Figure 2:
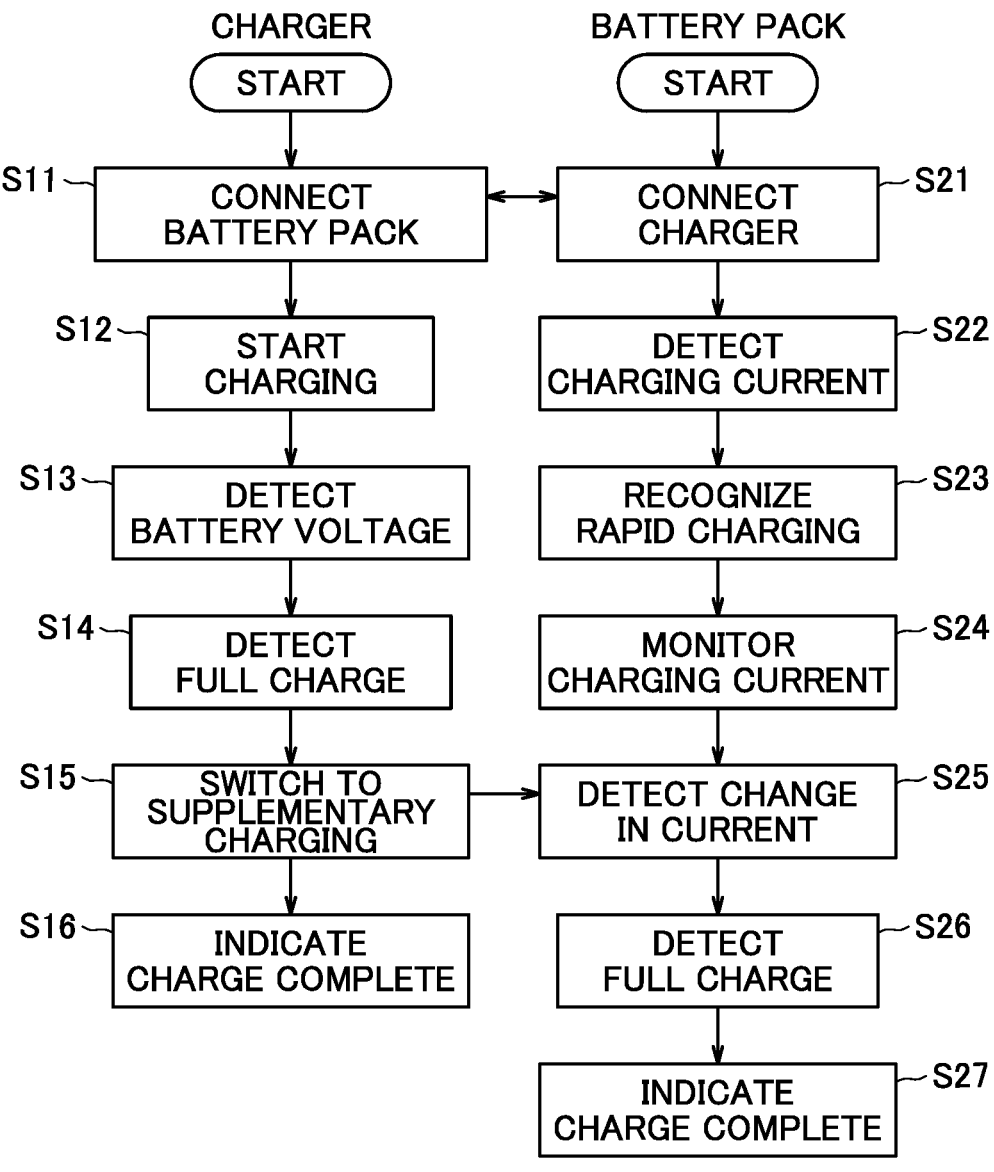
FIG. 2 shows a flowchart for determining a full charge of a battery pack according to the embodiment.
Figure 3:
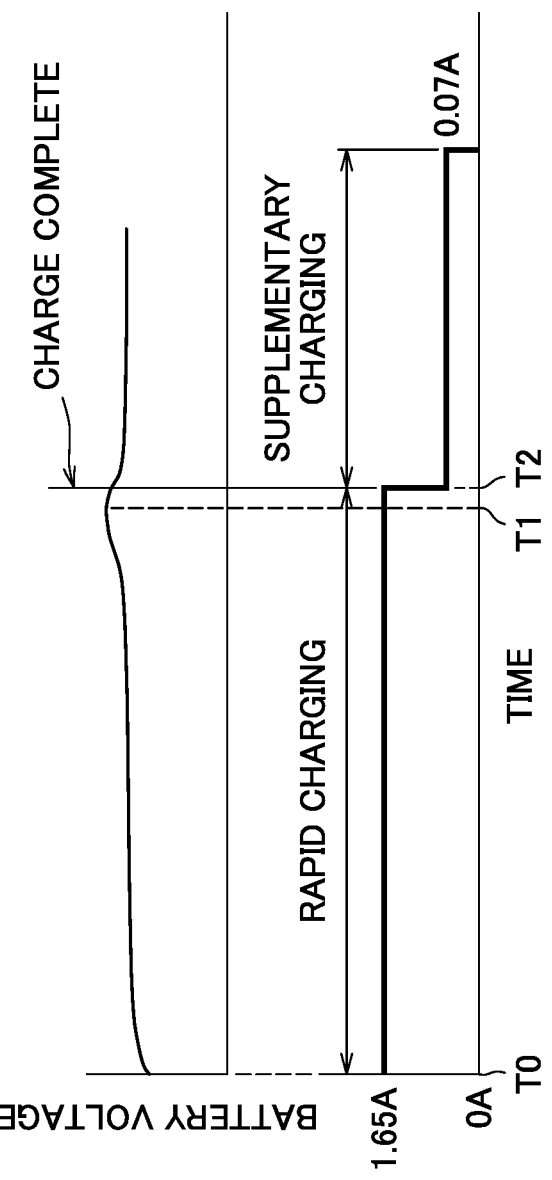
FIG. 3 shows a time chart of a charging voltage and a charging current of the battery pack according to the embodiment.

Next, the charging of the battery pack 20 by way of the charger 10 will be described with reference to FIGS. 2 and 3.

When the battery pack 20 is connected to the charger 10 (step S11 and step S21), the charger 10 detects at time T0 that the battery pack 20 is connected to the charger 10 by way of a voltage drop between the positive electrode terminal 11 and the negative electrode terminal 12 or a voltage drop at the battery temperature terminal 13.

Since the voltage between the positive electrode terminal 11 and the negative electrode terminal 12 is equal to the battery voltage across the battery pack 20, the control circuit 14 in the charger 10 determines that the battery pack 20 needs the rapid charging for increasing the battery capacity. The control circuit 14 then flows a rapid charging current of 1.65 A to the battery pack to start the rapid charging for the battery pack 20 (step S12). The control circuit 14 detects the battery voltage across the battery pack 20 intermittently or continuously (step S13). The start of the rapid charging of the charger 10 causes the LED of the indication unit 15 to be turned on so as to indicate the battery pack is "charged". When the charger 10 starts the rapid charging for the battery pack 20, the battery voltage across the secondary battery 21 gradually increases.

At this time, charging to the secondary battery 21 is started in the battery pack 20. The current detection unit 22 detects the charging current, and the control circuit 24 reads the detected charging current as a charging current value (step S22). The control circuit 24 recognizes, from the charging current value, that the charging current is a rapid charging current and that the charging is a rapid charging (step S23). Therefore, from among the LEDs of the indication unit 25, the control circuit 24 turns on the red LED for indicating that the battery pack 20 is in "charging" and starts to monitor the charging current (step S24).

The charger 10 continues the rapid charging for the battery pack 20. The charger 10 detects a full charge of the battery pack 20 (step S14) when the charger 10 detects a voltage decrease ($-\Delta V$) from a peak value at time T2 after the battery voltage of the battery pack 20 on the rise reaches the peak value at time T1 and then turns to decrease. Then, the charger 10 ends the rapid charging. At the same time, the charger 10 switches the charging of the battery pack 20 to the supplementary charging to maintain the full charge at and after the time T2 (step S15). In the supplementary charging, the charger 10 flows a supplementary charging current of 0.07 A to the battery pack 20 and turns off the LED of the indication unit 15 (step S16).

On the other hand, in the battery pack 20, the control circuit 24 detects, at the time T2, a decrease in the amount of the charging current that exceeds a predetermined ratio by way of the output signal from the current detection unit 22, thereby detecting that the charging current has been switched from the rapid charging current to the supplementary charging current (step S25). As a result, the control circuit 24 of the battery pack 20 recognizes that the control circuit 14 in the charger 10 has determined that the battery pack 20 is fully charged (step S26).

In this manner, the battery pack 20 can recognize that the charger 10 has detected the full charge of the battery pack 20 itself by way of the decrease in the charging current that exceeds the predetermined ratio (step S26). Therefore, the indication of "charging" of the indication unit 25 is ended when the charging of the charger 10 is switched to the supplementary charging (step S27). Then, the battery pack 20 calculates and indicates the battery capacity. In other words, by using the decrease in the charging current per unit time by the predetermined ratio or more, the determination of the full charge made by the charger 10 can be transmitted to the control circuit 24 in the battery pack 20 so that the indications of the charge complete of the charger 10 and the battery pack 20 can be matched. The timing of switching the indication from "charging" to "charge complete" in the indication unit 15 of the charger 10 and the timing of switching the indication from "charging" to "charge complete" in the indication unit 25 of the battery pack 20 can be matched without using communication means.

Therefore, in the embodiment described above, the need for the communication means between the charger 10 and the battery pack 20 can be obviated. As a result, the number of terminals in either of the charger 10 and the battery pack 20 can be reduced, thereby making it possible to easily configure either of the charger 10 and the battery pack 20. More specifically, the number of terminals of the charger can be reduced from the conventional four, that is, four terminals consisting of two charging output terminals, one battery temperature terminal, and one communication terminal, to three, that is, three terminals consisting of two charging output terminals and one battery temperature terminal.

Figure 4:
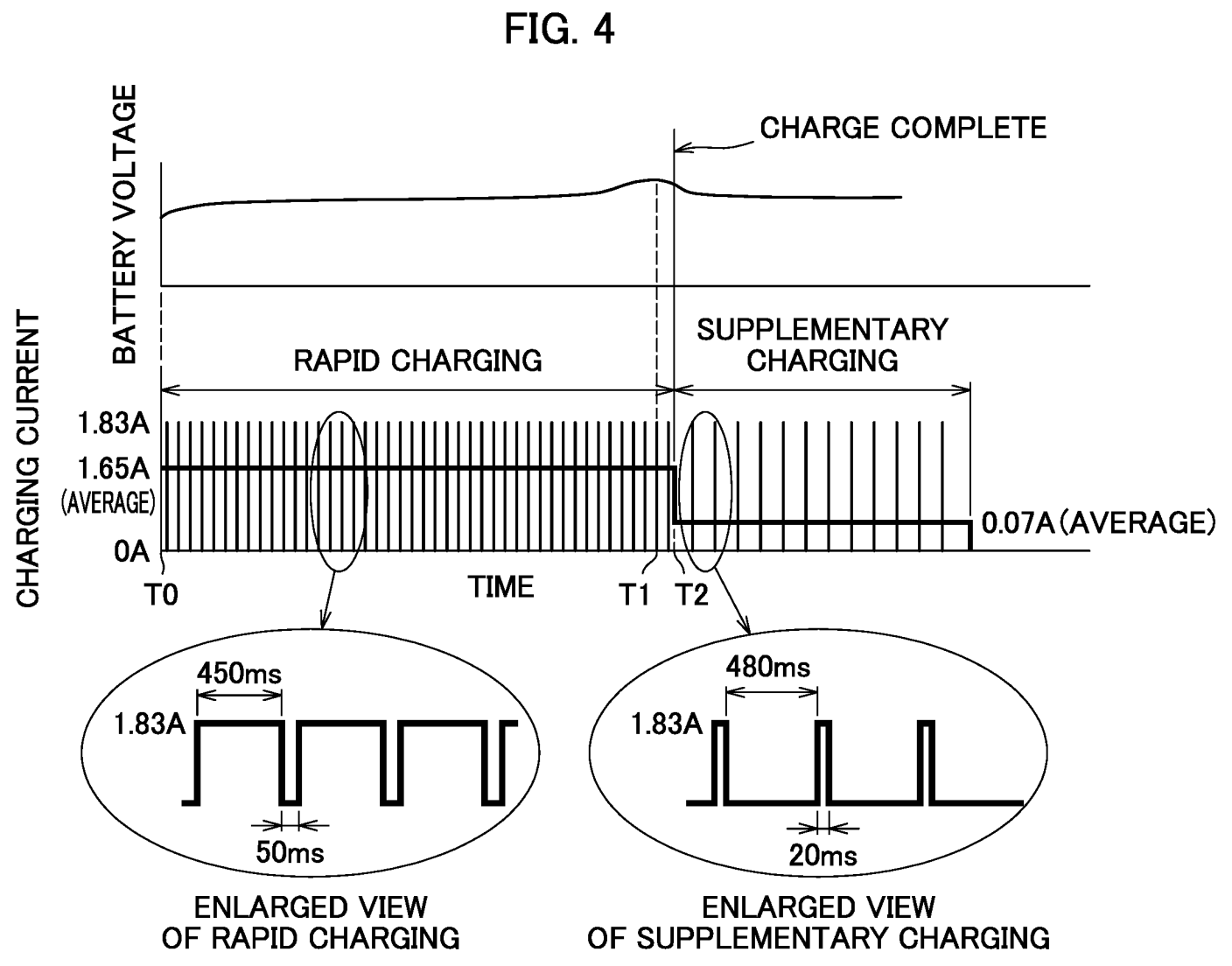

Next, a modified example of the charging of the battery pack 20 by way of the charger 10 will be described with reference to FIG. 4.

In this embodiment, the configuration of the charger 10 and the battery pack 20 is the same as that of the embodiment described above. The charging of the battery pack 20 by way of the charger 10 will be described with reference to FIG. 4.

When the battery pack 20 is connected to the charger 10, the charger 10 detects, at time T0, that the battery pack 20 is connected to the charger 10 by way of a voltage drop between the positive electrode terminal 11 and the negative electrode terminal 12 or a voltage drop at the battery temperature terminal 13.

The control circuit 14 in the charger 10 determines from the battery voltage across the battery pack 20 that the battery pack 20 needs the rapid charging for increasing the battery capacity, and flows a rapid charging current composed of continuous pulse currents so as to start the charging of the battery pack 20. The rapid charging current is a pulse current having a cycle of 500 ms, a duty ratio of 90%, and a maximum value of 1.83 A, and the average current thereof is 1.65 A. The start of the charging of the charger 10 causes the LED of the indication unit 15 to be turned on so as to indicate that the battery pack is "charged". When the charger 10 starts the rapid charging, the battery voltage of the secondary battery 21 gradually increases.

At this time, charging to the secondary battery 21 is started in the battery pack 20. The current detection unit 22 detects the charging current, and the control circuit 24 reads the detected charging current as a charging current value. The control circuit 24 recognizes, from the charging current value, that the charging current is a rapid charging current and that the charging is a rapid charging. Therefore, from among the LEDs of the indication unit 25, the control circuit 24 turns on the red LED for indicating that the battery pack 20 is "charged". Then, the control circuit 24 starts to monitor the charging current.

The charger 10 continues the rapid charging of the battery pack 20. Then, the charger 10 detects a full charge of the battery pack 20 when the charger 10 detects a voltage decrease ($-\Delta V$) from a peak value at time T2 after the increasing battery voltage of the battery pack 20 reaches the peak value at time T1 and then turns to decrease. Then, the charger 10 ends the rapid charging. At the same time, the charger 10 switches the charging of the battery pack 20 to the supplementary charging for maintaining the full charge at and after the time T2, and causes the supplementary charging current to be flown through the battery pack 20. In the supplementary charging, the supplementary charging current is a pulse current having a cycle of 500 ms, a duty ratio of 4%, and a maximum value of 1.83 A, and the average current thereof is 0.07 A. The ratio of the supplementary charging current to the rapid charging current is about 4.4%. Then, the charger 10 turns off the LED of the indication unit 15.

At this time, in the battery pack 20, the control circuit 24 detects, at the time T2, the decrease in the amount of the charging current that exceeds a predetermined ratio, for example, a reduction rate of 95% or more, by way of the output from the current detection unit 22, thereby detecting that the charging current has been switched from the rapid charging current to the supplementary charging current. As a result, the control circuit 24 in the battery pack 20 recognizes that the control circuit 14 of the charger 10 has determined that the battery pack 20 is fully charged.

In the embodiment described above, the battery pack 20 detects the decrease in the amount of the charging current flowing from the charger 10, thereby enabling the control circuit 24 of the battery pack 20 to recognize that the charger 10 has determined that the battery pack 20 is fully charged. The decrease in the amount of the charging current can be detected not only by the decrease in the amount of the current per unit time but also by the change in the pulse duty ratio of the pulse current.

In the embodiment described above, in the same manner as the embodiment previously described, the timing of switching the indication from "charging" to "charge complete" in the indication unit 15 of the charger 10 and the timing of switching the indication from "charging" to "charge complete" in the indication unit 25 of the battery pack 20 can be matched without using the communication means. Therefore, the need for the communication means between the charger 10 and the battery pack 20 can be obviated. As a result, the number of terminals in either of the charger 10 and the battery pack 20 can be reduced, thereby making it possible to easily configure either of the charger 10 and the battery pack 20.

It should be noted that in the embodiment described above, for the timing of switching the indications of the charger and the battery pack from "charging" to "charge complete", the detection of the decrease in the amount of the charging current which is from the rapid charging to the supplementary charging is used when the full charge of the battery pack is detected. However, if the charger is a type of the charger that does not perform the supplementary charging, the timings of switching the indications of the charger and the battery pack from "charging" to "charge complete" can be the same by using supply stop of the charging current.

Further, the ratio of the supplementary charging current to the rapid charging current can be appropriately changed according to the type of the battery pack 20 charged by the charger 10.

INDUSTRIAL APPLICABILITY

The present disclosure can be used for a battery pack including a secondary battery and a method for charging the battery pack.

EXPLANATION OF REFERENCE SIGNS

1 Charging system
10 Charger
20 Battery pack
21 Secondary battery
22 Current detection unit
24 Control circuit

The invention claimed is:

1. A battery pack comprising:
a secondary battery;
current measurement means for measuring a charging current for charging the secondary battery; and
a control circuit that receives an output signal from the current measurement means,
wherein the control circuit determines that the secondary battery is fully charged when a reduction rate of the charging current in a unit time exceeds a predetermined value.

2. The battery pack according to claim 1, wherein:
the charging current includes a rapid charging current for increasing a battery capacity of the secondary battery and a supplementary charging current for maintaining a full charge of the secondary battery; and wherein:
the reduction rate of the charging current in the unit time corresponds to a change rate of the charging current when the charging current is switched from the rapid charging current to the supplementary charging current.

3. The battery pack according to claim 2, wherein:

the rapid charging current includes a pulse current having a first duty ratio;

the supplementary charging current includes a pulse current having a second duty ratio shorter than the first duty ratio; and the control circuit determines that the battery pack is fully charged when a duty ratio of the charging current is switched from the first duty ratio to the second duty ratio.

4. The battery pack according to claim 3, further comprising indication means for indicating a charge state of the secondary battery, wherein the control circuit causes the indication means to indicate a full charge state of the secondary battery when the control circuit determines that the secondary battery is fully charged.

5. The battery pack according to claim 2, further comprising indication means for indicating a charge state of the secondary battery, wherein the control circuit causes the indication means to indicate a full charge state of the secondary battery when the control circuit determines that the secondary battery is fully charged.

6. The battery pack according to claim 1, further comprising indication means for indicating a charge state of the secondary battery, wherein the control circuit causes the indication means to indicate a full charge state of the secondary battery when the control circuit determines that the secondary battery is fully charged.

7. A method for charging a battery pack provided with a secondary battery, current measurement means for measuring a charging current for charging the secondary battery, and a control circuit which receives an output signal of the current measurement means, the method comprising:

determining, by the control circuit, that the secondary battery is fully charged when a reduction rate of the charging current in a unit time exceeds a predetermined value.

8. The method according to claim 7, wherein the battery pack is further provided with indication means for indicating a charge state of the secondary battery; and wherein the control circuit causes the indication means to indicate a full charge state of the secondary battery when the control circuit determines that the secondary battery is fully charged.

* * * * *